United States Patent
Kompalli et al.

(10) Patent No.: US 9,870,609 B2
(45) Date of Patent: Jan. 16, 2018

(54) SYSTEM AND METHOD FOR ASSESSING USABILITY OF CAPTURED IMAGES

(71) Applicant: Conduent Business Services, LLC, Dallas, TX (US)

(72) Inventors: Pramod Sankar Kompalli, Telangana (IN); Arjun Sharma, Karnataka (IN); Richard L. Howe, Webster, NY (US)

(73) Assignee: Conduent Business Services, LLC, Dallas, TX (US)

( * ) Notice: Subject to any disclaimer, the term of this patent is extended or adjusted under 35 U.S.C. 154(b) by 39 days.

(21) Appl. No.: 15/172,526

(22) Filed: Jun. 3, 2016

(65) Prior Publication Data
US 2017/0352143 A1    Dec. 7, 2017

(51) Int. Cl.
G06K 9/00 (2006.01)
G06T 7/00 (2017.01)
G06K 9/62 (2006.01)
G06K 9/66 (2006.01)
B64C 39/02 (2006.01)

(52) U.S. Cl.
CPC .......... G06T 7/0002 (2013.01); B64C 39/024 (2013.01); G06K 9/6267 (2013.01); G06K 9/66 (2013.01); B64C 2201/127 (2013.01); B64C 2201/146 (2013.01); G06T 2207/10032 (2013.01); G06T 2207/20081 (2013.01); G06T 2207/30168 (2013.01)

(58) Field of Classification Search
CPC .............. G06T 7/0004; G06T 7/60; G06T 2207/30181; G06T 2207/30108; G06Q 50/08; G06Q 50/16; G06K 9/52; G06K 9/6215; G06K 9/6267

USPC ................ 382/157, 162, 190, 255
See application file for complete search history.

(56) References Cited

U.S. PATENT DOCUMENTS

| | | | |
|---|---|---|---|
| 6,098,070 | A | 8/2000 | Maxwell |
| 6,219,930 | B1 | 4/2001 | Reid |
| 7,676,061 | B2 | 3/2010 | Harrison et al. |
| 8,078,875 | B2 | 12/2011 | Cowburn et al. |
| 8,170,840 | B2 | 5/2012 | Pershing |

(Continued)

OTHER PUBLICATIONS

Huang H. et al., "Rule-based Roof Plane Detection and Segmentation from Laser Point Clouds", In: Stilla U, Gamba P., Juergens C., Maktav D. (Eds) JURSE 2011—Joint Urban Remote Sensing Event—Munich, Germany, Apr. 11-13, 2011.

(Continued)

Primary Examiner — Sheela C Chawan
(74) Attorney, Agent, or Firm — Fox Rothschild LLP (57) ABSTRACT

A system estimates quality of a digital image by accessing a corpus of digital images of one or more subjects, such as a facet of a property. The system will receive, for at least a subset of the corpus, an indicator that one or more patches of each image in the subset is out of focus. The system will train a classifier by obtaining a feature representation of each pixel in each image, along with a focus value that represents an extent to which each pixel in the image is in focus or out of focus. The system will use the classifier to analyze pixels of a new digital image and assess whether each analyzed pixel in the new digital image is in focus or out of focus. The system may use the image to assess whether an incident occurred, such as storm-related damage to the property.

20 Claims, 7 Drawing Sheets

(56) References Cited

U.S. PATENT DOCUMENTS

| | | | |
|---|---|---|---|
| 8,209,152 B2 | 6/2012 | Pershing | |
| 8,346,578 B1 | 1/2013 | Hopkins, III et al. | |
| 8,401,222 B2 * | 3/2013 | Thornberry | G06K 9/00637 382/100 |
| 8,401,877 B2 | 3/2013 | Salvagio | |
| 8,515,125 B2 | 8/2013 | Thornberry et al. | |
| 8,670,961 B2 | 3/2014 | Pershing et al. | |
| 8,731,234 B1 | 5/2014 | Ciarcia et al. | |
| 8,754,975 B2 * | 6/2014 | Hjelmstrom | H04N 5/217 348/335 |
| 8,756,085 B1 | 6/2014 | Plummer et al. | |
| 8,774,525 B2 | 7/2014 | Pershing | |
| 8,775,219 B2 | 7/2014 | Swanson et al. | |
| 8,818,572 B1 | 8/2014 | Tofte et al. | |
| 8,818,770 B2 | 8/2014 | Pershing | |
| 8,825,454 B2 | 9/2014 | Pershing | |
| 8,872,818 B2 * | 10/2014 | Freeman | G01S 17/023 345/419 |
| 8,874,454 B2 | 10/2014 | Plummer et al. | |
| 8,929,586 B2 | 1/2015 | Brown | |
| 8,977,520 B2 | 3/2015 | Stephens et al. | |
| 8,995,757 B1 | 3/2015 | Ciarcia et al. | |
| 9,002,719 B2 | 4/2015 | Tofte | |
| 9,291,544 B1 * | 3/2016 | Boyer | G01N 19/08 |
| 9,536,148 B2 * | 1/2017 | Gross | G06T 1/0007 |
| 9,601,940 B2 * | 3/2017 | Camp | H02J 7/0018 |
| 2005/0251427 A1 | 11/2005 | Dorai et al. | |
| 2006/0095304 A1 | 5/2006 | Madison et al. | |
| 2008/0103841 A1 | 5/2008 | Lewis et al. | |
| 2008/0284849 A1 * | 11/2008 | Kassem | E04D 15/00 348/143 |
| 2009/0063234 A1 | 3/2009 | Refsland et al. | |
| 2009/0265193 A1 | 10/2009 | Collins et al. | |
| 2009/0276708 A1 | 11/2009 | Smith et al. | |
| 2010/0179787 A2 | 7/2010 | Pershing et al. | |
| 2010/0215212 A1 | 8/2010 | Flakes, Jr. | |
| 2010/0257477 A1 | 10/2010 | Nielsen et al. | |
| 2013/0117078 A1 | 5/2013 | Welk, III et al. | |
| 2013/0297353 A1 | 11/2013 | Strange et al. | |
| 2014/0032433 A1 | 1/2014 | Eick et al. | |
| 2014/0039935 A1 | 2/2014 | Rivera | |
| 2014/0149144 A1 | 5/2014 | Li et al. | |
| 2016/0086285 A1 | 3/2016 | Jordan Peters et al. | |

OTHER PUBLICATIONS

El-merabet Y. et al., "Watershed regions and watershed lines based cooperation strategy for image segmentation. Application to roof detection", ISSPIT '11 Proceedings of the 2011 IEEE International Symposium on Signal Processing and information Technology, pp. 393-398.

Bretar F. et al., "Recognition of Building Roof Facets by Merging Aerial Images and 3D Lidar Data in a Hierarchical Segmentation Framework", 18th International Conference on Pattern Recognition (ICPR'06) (vol. 4), Hong Kong Aug. 20, 2006-Aug. 24, 2006.

Krizhevsky A. et al., "ImageNet Classification with Deep Convolutional Neural Networks", Advances in Neural Information Processing System 25, 2012, p. 1106-1114.

* cited by examiner

SYSTEM AND METHOD FOR ASSESSING USABILITY OF CAPTURED IMAGES

BACKGROUND

This disclosure relates to automated methods and systems that capture images. The methods and systems described below may capture images, process the images, and use the information gathered from the processed images to determine certain information about the images. For example, the images may be of property damage, and the system may verify whether the property has been damaged by weather incidents. The verification may be used for purposes such as automated property damage claim verification.

Today, when an owner of a building or other structure experiences property damage resulting from an incident such as hail, wind, lightning, vandalism, or other activity, several steps must occur to remediate the damage. In some situations, the property owner may need to ask a construction contractor to assess the damage in order to determine what is needed to fix the property. In other situations, the property owner may need to submit a claim to its property insurer.

In either situation, it is often desirable to capture images of the damage to assist the contractor or property insurer in assessing the claim. However, current methods of capturing images for property damage assessment are costly and time consuming. Manual collection of images is time-consuming, and the demand for manual inspection can exceed the capacity of a workforce after storm events where damage is widespread. In addition, images captured manually may not be of sufficient quality for proper assessment of the claim or repairs. For example, because many of the captured images may be out of focus, extra photos must be taken, and a return visit to the property may be required.

This document describes devices and methods that are intended to address issues discussed above and/or other issues.

SUMMARY

In various embodiments, a system for estimating image quality of a digital image includes one or more imaging devices, a processing device, and a computer-readable medium containing programming instructions that are configured to cause the processing device to estimate the image quality. The system will access a corpus of digital images of one or more subjects, such as images of one or more facets of a property taken by one or more image capturing devices after an incident such as a storm event. The system will receive, for at least a subset of the corpus of digital images, an indicator that one or more patches of each image in the subset is out of focus, The system will train a classifier by obtaining and storing in a data store: (i) an n-dimensional feature representation of each pixel in each image; and (ii) a focus value that represents an extent to which each pixel in the image is in focus or out of focus. The system will use the classifier to analyze pixels of a new digital image and output an assessment of whether each analyzed pixel in the new digital image is in focus or out of focus.

The system also may analyze the assessments prepared for each of several new digital images. For each new digital image that has been assessed, the system may determine whether the assessment for the new digital image satisfies a usability criterion. Example usability criteria include: (i) a requirement that all pixels of the new digital image have at least a threshold focus value; (ii) a requirement that an average focus value for all pixels in the new digital image be equal to or above a threshold focus value; (iii) a requirement that no more than a threshold number of pixels in the new digital image have a focus value that is less than a minimum acceptable focus value; or (iv) a requirement that no more than a first threshold number of pixels in the new digital image have a focus value that is less than a first minimum acceptable focus value, and that no more than a second threshold number of pixels in the new digital image have a focus value that is less than a second minimum acceptable focus value. If an assessment for a new digital image satisfies a usability criterion, the system may use that new digital image to make a determination. For example, in property damage assessment, the system may determine whether that new digital image depicts damage that corresponds to a particular incident. Otherwise, the system will not use that new digital image to determine whether that new digital image depicts damage that corresponds to the particular incident.

When obtaining the n-dimensional feature representation of each pixel in each image, the system may use a Convolutional Neural Network to: (i) apply any number of filters to a neighborhood around each pixel; (ii) determine whether each filtered neighborhood matches a kernel; assign a value at or near 1 to the pixels of any filtered neighborhood that matches the kernel; (iii) assign a value at or near zero to the pixels of any filtered neighborhood that does not match the kernel; and (iv) use the assigned values to determine the focus value. Optionally, when the system uses the assigned values to determine the focus value, it may do so using a two-layer neural network with sigmoid outputs Optionally, the processing device may be part of a mobile electronic device having a display and an imaging device. If so, the display may output a captured image while the imaging device is capturing additional images of one or more facets of the property. With each captured image, the mobile electronic device may output the assessment of whether each analyzed pixel in captured image is in focus or out of focus.

In another embodiment, the system may again determine whether the assessment for the new digital image satisfies a usability criterion. If the assessment does not satisfy the usability criterion, the system may automatically cause the imaging device to capture an additional new digital image of the facet of the property. If the imaging device is part of an aerial drone, the system may cause the imaging device of the aerial drone to capture the additional new digital image. The system also may prompt a user of the mobile electronic device to enter a navigational command for the aerial drone, and in response to receiving the navigational command the system may use a transmitter of the mobile electronic device to send the navigational command to the aerial drone.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

In this document, the term "aerial drone" refers to an unmanned vehicle that uses aerodynamic forces to provide vehicle lift, and that can fly autonomously or be piloted remotely. An aerial drone may also be referred to by those of skill in the art as an unmanned aerial vehicle (UAV), unmanned aircraft system (UAS), a remotely-piloted aircraft (RPA), or simply a drone.

In this document the terms "computer-readable medium," "data storage facility," "data store," and "memory" each refer to a non-transitory device on which computer-readable data, programming instructions, or both are stored. Unless the context specifically states that a single device is required or that multiple devices are required, the terms "computer-readable medium," "data storage facility," "data store," and "memory" include both the singular and plural embodiments, as well as portions of such devices such as memory sectors.

In this document, the term "electronic device" refers to a device or system of devices that include a processor and a computer-readable medium. The memory may contain programming instructions in the form of a software application that, when executed by the processor, causes the device to perform one or more processing operations according to the programming instructions. An electronic device also may include additional components such as a touch-sensitive display device, microphone, keyboard or keypad, or other components that serve as a user interface, as well as a camera or other imaging device. An electronic device also may include one or more communication hardware components such as a transmitter and/or receiver that will enable the device to send and/or receive signals to and/or from other devices, whether via a communications network or via near-field or short-range communication protocols. Examples of electronic devices include smartphones, digital cameras, tablet computing devices, aerial drones, personal computers, wearable electronic devices, and the like.

In this document, the terms "processor" and "processing device" refer to a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

In this document, the term "digital image" refers to any still image and/or set of video images captured and stored as one or more digital data files. Examples include pictures and videos that are captured by a camera or by an electronic device that includes a camera, visible spectrum images, infrared (IR) spectrum images, ultraviolet (UV) spectrum images, three-dimensional images gathered by LIDAR or other systems, images gathered by other remote sensing technologies, and the like.

In this document, the terms "imaging device" and "image capturing device" refer generally to a hardware sensor that is configured to acquire digital images. An imaging device may capture still and/or video images, and optionally may be used for other imagery-related applications. For example, an imaging device can be held by a user such as a DSLR (digital single lens reflex) camera, cell phone camera, or video camera. The imaging device may be part of an image capturing system that includes other hardware components. For example, an imaging device can be mounted on an accessory such as a monopod, tripod, or "selfie stick." The imaging device can also be mounted on a transporting vehicle such as an aerial drone, a robotic vehicle, or on a piloted aircraft such as a plane or helicopter.

In this document, the term "incident" means a physical action that caused damage or other loss to an item of physical property. Examples include a weather incident that damaged a building or vehicle (such as hail, wind, lightning damage, or other storm), or a falling object or collision that damaged a building or vehicle.

In this document, the term "facet" refers to a physical structure (or portion of a physical structure) that has been constructed on a parcel of real estate. Examples of facets include a roof or side of a building, a patio, a deck, a sidewalk, a driveway, or a fence.

Figure 1:
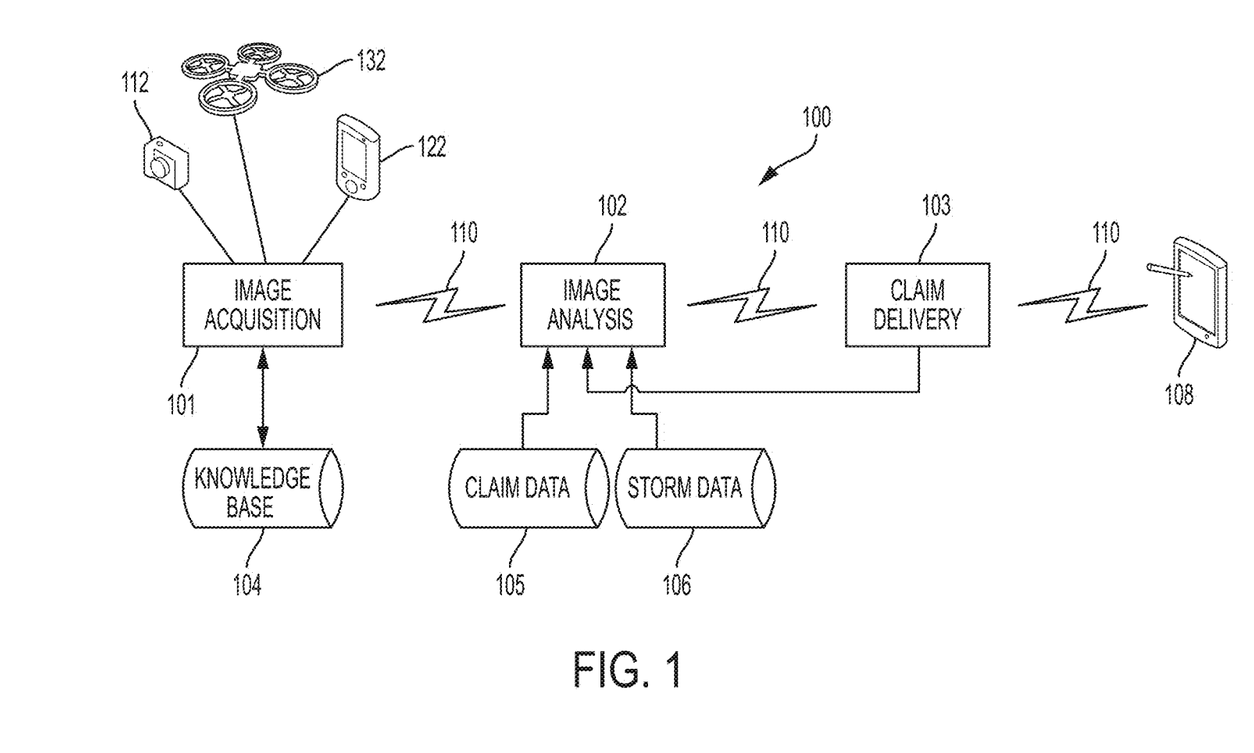
FIG. 1 illustrates a property damage verification system according to one embodiment.

With reference to FIG. 1, a property damage assessment and verification system 100 is shown by way of example. Other systems that include similar components are also included within the scope of this disclosure. An image acquisition system 101 captures digital images of the damaged facet(s) of the property via an imaging device 112, and transfers the captured digital images to the image analysis system 102 via a communication link 110. Optionally, the imaging device may be a component of an aerial drone 132 having a transceiver that can transfer captured digital images to other components of the system. The image analysis system 102 automatically analyzes the acquired digital images and communicates the property damage assessment results to a claim delivery system 103 via a communication link 112. The claim delivery system 103 communicates the claim results to an electronic device 108 of a relevant party via a communication link 112. The communication links may be separate or common components of a wired or wireless communication system, such as a wire or bus (in a wired system), or transmitter/receiver and/or communication port for use in a near-field, short-range, local-area, wide area, mobile data or other communications network (such as the Internet).

In one scenario, when a property owner believes that her property has suffered damage that is covered by her insurance policy, such as damage to a roof caused by a storm event such as hail, she may initiate the claim process by contacting her insurance company. The insurance company subsequently dispatches an operator, such as an insurance company adjuster, a third-party adjuster, or another party (for instance, a roofing contractor or a drone flying service company) to the property. In one embodiment, the image acquisition system 101 is or includes a portable electronic device that the operator carries, such as a cell phone camera used in handheld mode or mounted to a "selfie stick." In other embodiments, the image acquisition system 101 may include an imaging device 112 mounted to an aerial drone or robotic vehicle, along with a separate controlling electronic device 122 having a wireless transceiver to send control signals to and receive digital images from the aerial or robotic electronic device that contains the imaging device (or these images may be transferred from the aerial or robotic device later via a wired connection).

In some embodiments, the image acquisition system 101 may include a software application that runs on the electronic device to control operation of the imaging device 112. In some embodiments, the image acquisition system 101 includes a user interface (such as a microphone, keyboard or keypad) that can receive input from a user in typed or spoken form, and the software can be configured to receive commentary (voice or text) related to the images as the images are being captured. In one embodiment, the system enables the operator to perform all of the image acquisition actions from the ground and transmit the captured imagery to the insurance company.

In one embodiment, the image acquisition system 101 can include or have access to a knowledge base 104 that stores image acquisition parameters that characterize how the image sensor should operate to capture digital images for a particular property damage category, such as hurricane, hail storm, fire, etc. Examples of these parameters and methods include, but are not limited to, operation of the imaging device in response to various detected lighting conditions that a light sensor may detect (e.g., a command that operates a flash if the detected light level is below a threshold value, a size setting for an adjustable aperture of the imaging device in which the size is a function of the detected light level, a speed setting that determines as a function of the detected light level a speed within which a shutter of the imaging device will open or close, or an ISO setting that determines a sensitivity of the imaging device as a function of the detected light level. Other image acquisition parameters include image sensor positions and orientations. In embodiments where the image sensor is part of an aerial drone, the image acquisition parameters may be a flight path for the drone. The parameters also may include commands to adjust for various other conditions that may be present when the digital images are captured, such as weather conditions or the like.

Image analysis system 102 includes a processor and programming instructions to receive and automatically analyze the acquired images using a set of image processing criteria via computer vision, machine learning, and/or other methods and determine whether to process the property damage claim, deny the claim based on one or more claim processing criteria, or recommend that the claim be dispositioned by a human. The image analysis system 102 may determine whether legitimate, naturally-occurring property damage exists based on whether the damage is consistent with claims processing data 105 and other corroborating data such as storm data 106 (such as weather data, or a date confirming that an event that ostensibly caused the damage actually occurred). The image analysis system 102 may also determine the measurements and other data necessary to compute the amount of the claim payment. Alternatively and/or additionally, the image analysis system 102 may also generate a request for some or all of this data from other systems or providers if the data is not determined or unavailable. In some embodiments, the image analysis system 102 may also send some or all data necessary to compute the amount of the claim and send it to all downstream systems and parties involved in processing the claim. Various components of the image analysis system may operate automatically, or the system may operate substantially automatically with some human input or intervention.

Claim delivery system 103 communicates with other parties involved such as an insurance provider and includes a transceiver or communication port that can send data via a communication link, whether wired or wirelessly, and deliver the final disposition as to whether a claim is valid based on a determination that property damage actually occurred. It may pass along, or request the generation of, and deliver all data and measurements necessary to allow for the computation of the claim amount.

While the discussion of FIG. 1 above refers to insurance claim processing and claim data, the system also may be used to provide contractors information needed to assess actions required to remediate property damage. In this case, the database of claim data 105 may include information about previous damage claims and actions taken to remediate those claims, so that the system can assist the contractor in identifying actions required to remediate the new claim.

One or more processors of the system may use a machine learning approach to estimate and assign a value to the focus of various pixels of a digital image. The system does this for any given pixel based on information obtained from a small image-patch surrounding the given pixel. As a result, the focus value for any pixel is based on learned, measurable data, rather than by human interpretation. A machine learning solution for this approach may include: (i) a corpus of digital images that serves as a training dataset with labelled exemplars for each class; (ii) a feature representation for each of the data samples; and (iii) a classification model that is trained using the training data.

Figure 2:
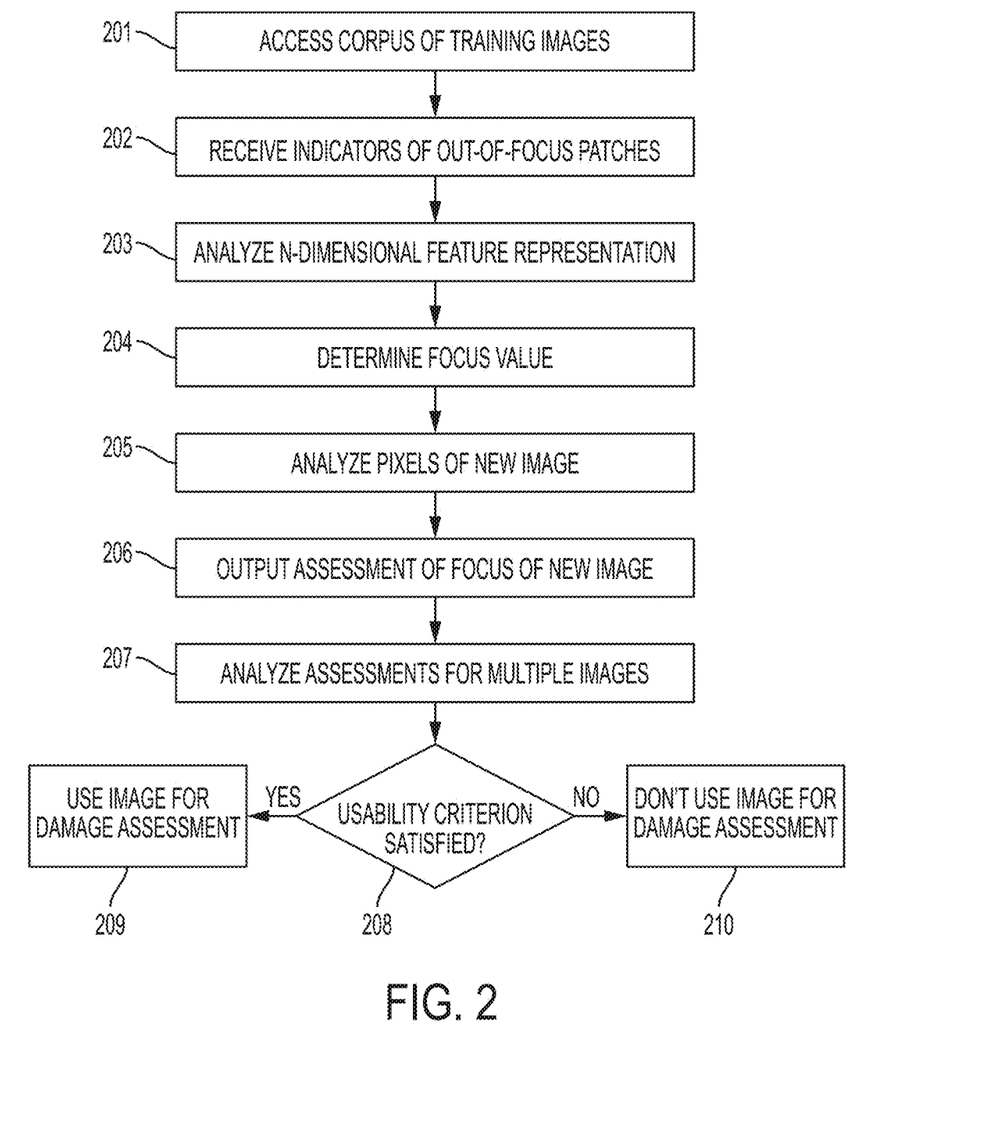
FIG. 2 illustrates an example of a process by which a focus estimation system may operate.
Figure 3:
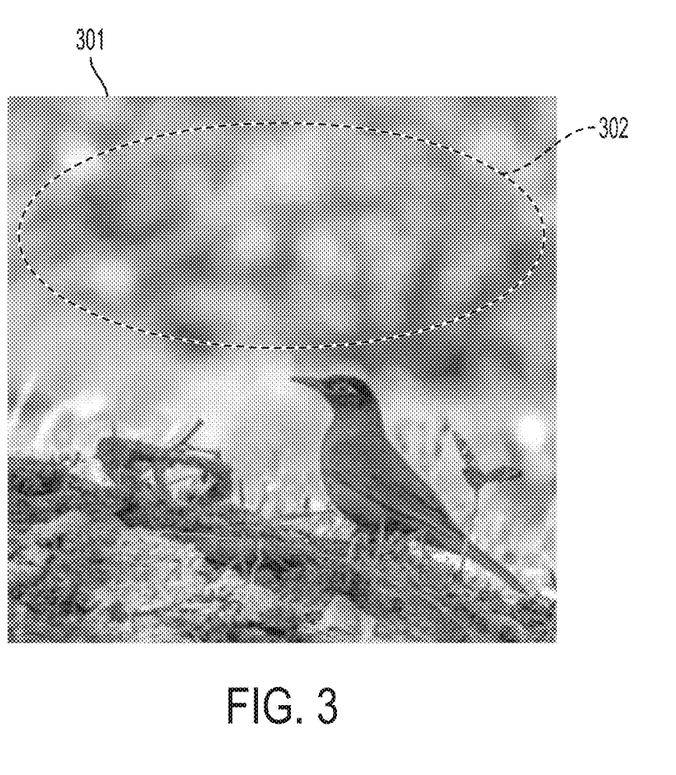
FIG. 3 illustrates an example of an image in which regions have been indicated as either focused or blurred.

FIG. 2 illustrates a high-level overview of how the focus estimation system may operate. The system may access 201 a corpus of digital images of a facet of a property taken by one or more image capturing devices after a storm event. A user of the system may use a user interface such as a touch-screen or a digital document scanner to provide, and the system may receive 202, a subset of the digital images, in which the images are marked up to include an indicator that one or more patches of each image in the subset is out of focus. An example of this is shown in FIG. 3, in which an image 301 has been modified to include an indicator 302 (in this case, an ellipse, but which may be any appropriate shape or other graphic indicator) of an out-of-focus region of the image.

Returning to FIG. 1, the system may train a classifier by obtaining and storing in a data store: (i) an n-dimensional feature representation of each pixel in each image 203; and (ii) a focus value for each pixel that represents an extent to which each pixel in the image is in focus or out of focus 204. The focus value of each pixel can be binary, or it can be any range between an upper value and a lower value, such as [0, 1]. It should be understood that the discussion in this context does not necessarily require that the system analyze or determine a focus value (or perform other analysis steps described below) for each and every pixel in any image, but rather that the focus value be determined (and other steps be performed) at a pixel-specific level for multiple pixels in each image.

The system may then use the classifier to analyze pixels 205 of a new digital image and output 206 an assessment of whether each analyzed pixel in the new digital image is in focus or out of focus.

When the system has generated assessment results for more than one digital image, it may analyze 207 the assessments prepared for each of the digital images to determine whether the assessment satisfies at least one usability criterion 208. The usability criterion is a threshold value against which the focus values of the digital image's pixels is compared. Examples of usability criteria include: (i) a requirement that all pixels of the digital image have at least a threshold focus value; (ii) a requirement that an average focus value of all pixels in the image be equal to or above a threshold focus value; (iii) a requirement that no more than a threshold number of pixels in the image have a focus value that is less than a minimum acceptable focus value; or (iv) a requirement that no more than a first threshold number of pixels in the image have a focus value that is less than a first minimum acceptable focus value and that no more than a second threshold number of pixels in the image have a focus value that is less than a second minimum acceptable focus value. The criterion also may require that a particular region (e.g., foreground, background) of an image satisfy any of the criteria listed above (and thus be in focus or out of focus). If a digital image satisfies a usability criterion, the system may use that digital image to determine whether that digital image depicts damage that corresponds to a predetermined incident 209. Otherwise the digital image will be ignored in the damage assessment process 210.

Figure 4:
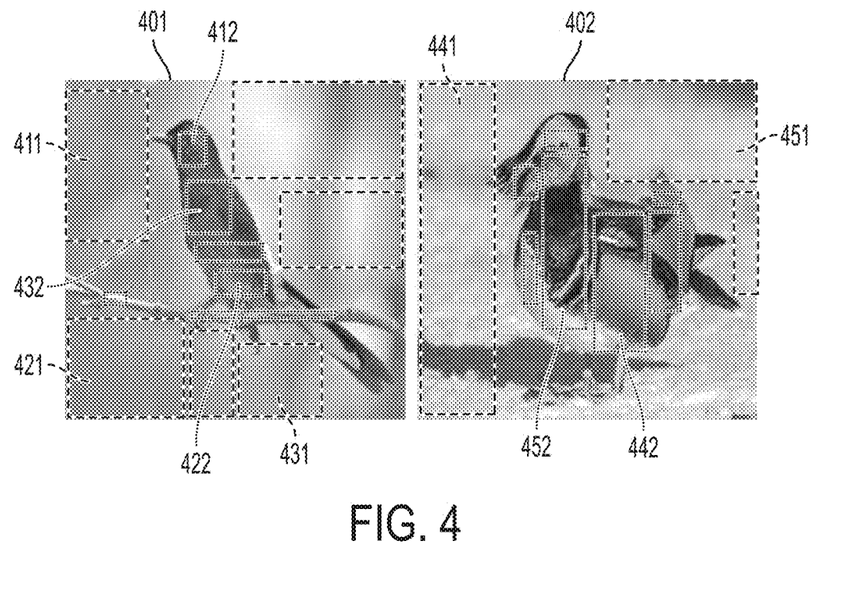
FIG. 4 illustrates an example of image segmentation according to one embodiment.

For example, a dataset may include images of birds, such as the images shown in FIG. 4. The choice of bird photographs for this example was motivated by the observation that they typically have a blurred background owing to the large distance of capture and the distance of the bird from the background. The dataset includes images of a variety of birds 401, 402 in varying background conditions. In each example, some image patches labelled as focused or blurred 411, 421, 431, 441, 451, while areas that are in proper focus are also labeled 412, 422, 432, 442, 452. Note that all regions of the image need not be labeled. The classifier is trained over a subset of pixels obtained from a group of images, and tested on the rest of the images. The classifier only needs to learn the focus/de-focus classification and does not need to identify or distinguish the content (e.g., bird-vs-background).

To determine a focus value for each pixel, the system considers each pixel to be represented by features extracted from the region surrounding it, referred to in this document as a patch. A patch may be any number of pixels that surround a given pixel and that are within any suitable boundary. The features are pixel level statistics obtained from the region surrounding the given pixel. A Neural Network such as a Convolutional Neural Network (CNN) may be trained to learn both the features and the classifier in one big learning step. The basic module of a CNN is known as a Convolutional Kernel, which is essentially a set of weights by which a patch of an image is filtered. If the input image-patch matches the kernel, the output of the filtering is high (i.e., at or near 1), otherwise it is low (i.e., at or near zero). Hence, the kernel can also be called a "feature map", since it allows only certain patterns (or features) to be carried to the next stage.

The output of this filtering operation may be the sum of the convolution of the kernel of that feature map with the feature maps of the previous layer (or channels of the input image). These layers may be called convolution layers or filter-bank layers. The convolution operation is followed by a non-linear activation function such as rectified linear (ReLu), sigmoid or tan h. Mathematically, $$y_j = f\left(\sum_i k_{ij} * x_i\right)$$

where $y_j$ is the $j^{th}$ feature map, $k_{ij}$ is the convolution kernel of the $j^{th}$ feature map for the $i^{th}$ feature map of the previous layer (or input image channel), $x_i$ is the $i^{th}$ feature map of the previous layer (or the $i^{th}$ image channel) and f is the activation function. Such a network may be trained on a large dataset of images and saved to a data storage facility.

The system may use the filters of a deep CNN learned on a large image dataset to estimate focus values for a region of a new image (i.e., step 205 in FIG. 2). The system may obtain the n-dimensional feature representation using, in this example, n=96. The first convolution layer of this architecture includes 96×3 (96 for each channel of a RGB image) filters of size 11×11 pixels. With appropriate zero padding of the input image, these filters can be convolved with the image to produce 96 filtered responses of the same size as the input image. The filtered response at location (i, j) for filter map k can then be thought of as a feature computed for pixel (i, j) of the original image. Each of the 96 feature maps can be seen as a detector for a different type of feature. The system will thus have a 96-dimensional (96-d) feature for each pixel of the original image. While this example only uses the filters of the first convolution layer in this work, this is not a limitation and filters from higher layers can be subsequently be applied to obtain a richer set of features.

Given images in which some regions have been labelled as focused or blurred, a classifier can be trained on the features obtained above. Continuing this example, the system may use a multi-layer perceptron (MLP) as a classifier. The MLP takes the 96-d feature representation of a pixel as an input. This input is then propagated through the hidden layers to obtain a new representation of the input vector. In this example the system may use an MLP with 2 hidden layers, with 256 and 128 hidden units and sigmoid non-linear activation function. The system will thus obtain a new 128-d hidden representation for the 96-d input. The hidden representation may then be given as an input to the output layer. The output layer may include a single neuron with sigmoid activation, so long as the system treats the problem of focus estimation as a binary classification problem (i.e., one or zero, focused or blurred). If so, the system may use the Binary Cross entropy loss as the loss function. Alternatively, it may also be possible to have any number of classes, each class corresponding to a level of focus (e.g., out of focus, in focus, or any level in between). Thus, an alternative example output layer may have three neurons corresponding to (1) completely in focus, (2) slightly blurred, and (3) completely out of focus.

The network may be trained using stochastic gradient descent with momentum. The loss may be back-propagated until only the classification layers and the weights of the convolutional layer are not updated. This, however, is not a limitation and the convolutional layer may also be fine-tuned for the task of focus estimation by back-propagating the loss through the convolutional layers.

To predict the focused regions of a test image, the 96-d feature may be obtained for each pixel location, and the classifier output for each such feature may determine whether the pixel is in focus or not. When the training procedure is learned over binary classes, the classifier outputs a real value in the range [0, 1], 1 being focused and 0 being out-of-focus. The assumption is that the classifier inherently learns the amount of sharpness or blur as a continuous function. The system may predict a pixel to be focused if the activation of the output neuron is greater than or equal to a certain threshold τ which is determined empirically. Testing may be relatively fast because the prediction for each pixel can be made in parallel.

Figure 5:
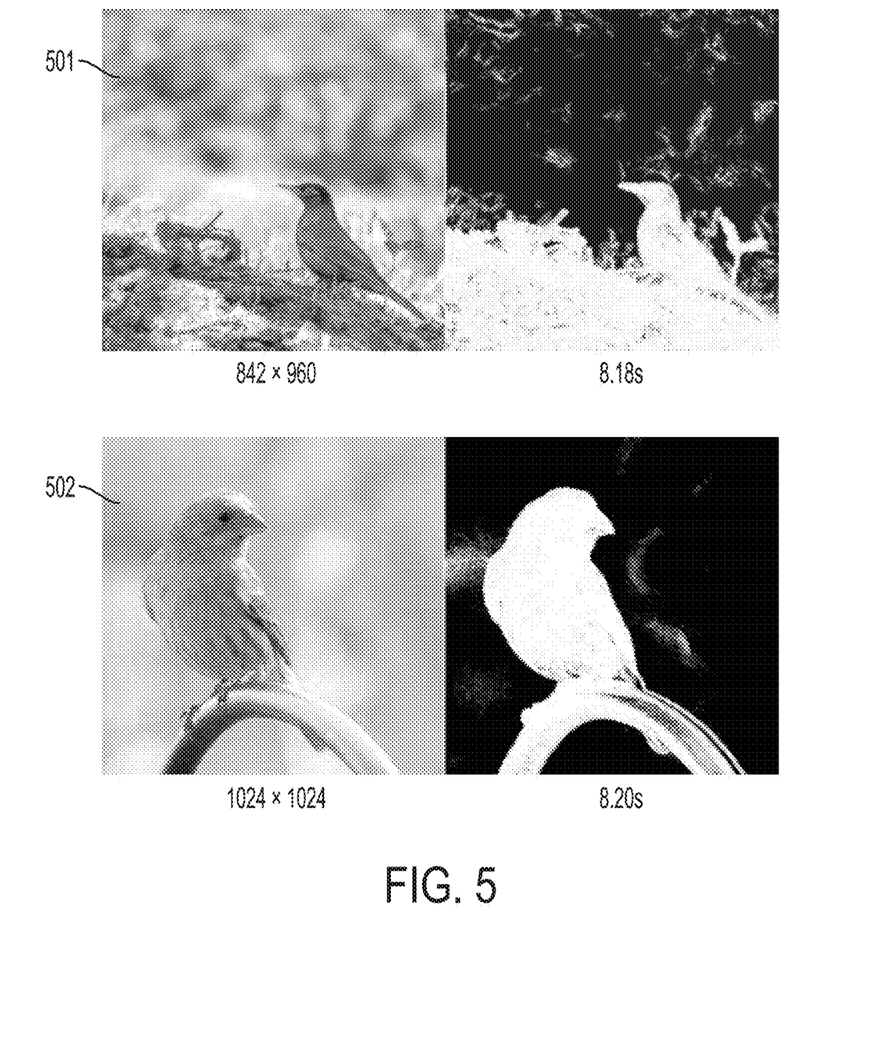
FIG. 5 illustrates an example output of the systems described in this document.

Examples of results of the method are presented in FIG. 5, in which original images 501, 502 are shown along with a focus-estimated image with brighter regions representing in-focus regions and darker regions representing out-of-focus regions.

The methods described in this document may be used to capture images of property damage and determine whether the images are suitable for use in property damage assessment and/or property damage claims processing. For example, a property damage analysis system may include a data storage facility containing a knowledge base of property damage incident types, as well as image acquisition parameters that are associated with each incident type. The system may cause an imaging device to capture digital images of the property using the image acquisition parameters. The system may determine whether a captured image is sufficiently in focus using the methods described above. If the image is sufficiently in focus, it may use the image for property damage assessment or claims processing. If the image not sufficiently in focus, it may cause the imaging device to capture another image, optionally using other parameters (such as movement of a drone carrying the imaging device to a better viewing position) until the imaging device captures a sufficiently usable image.

Figure 6:
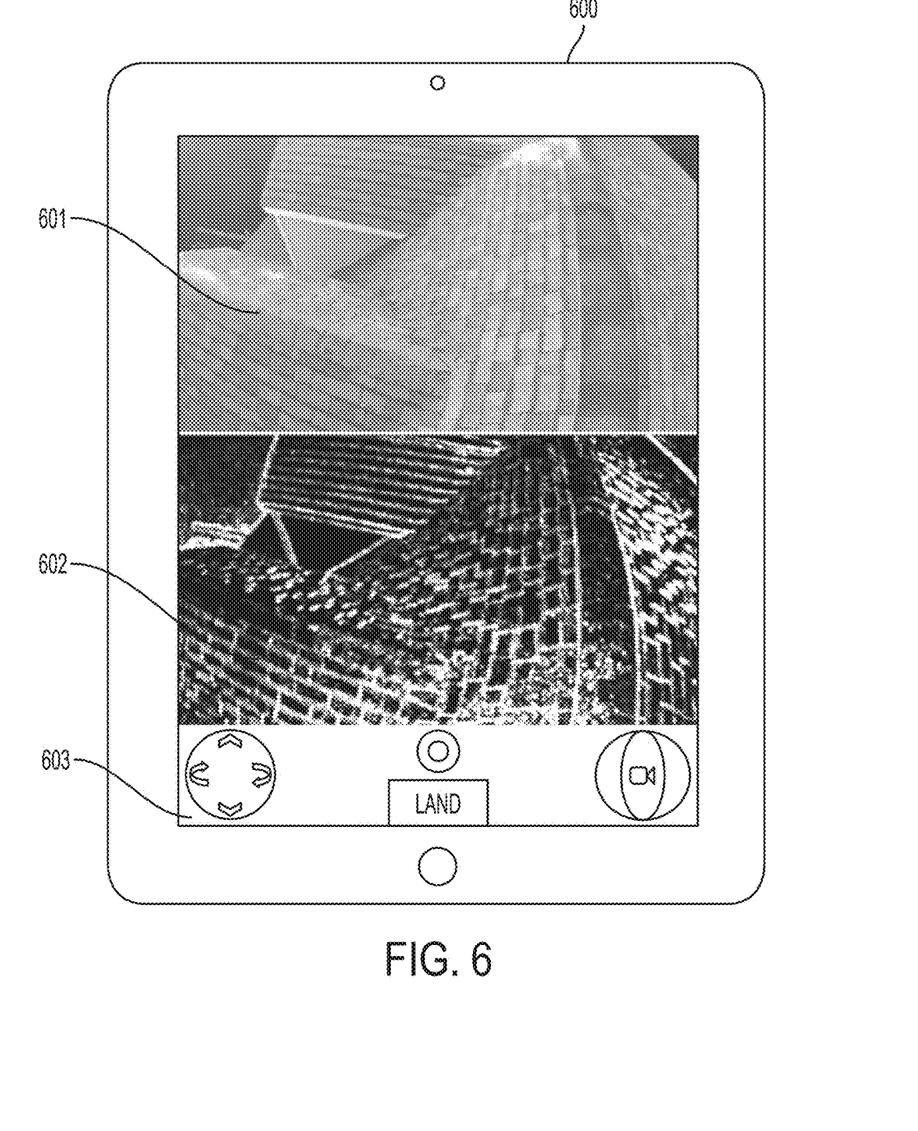
FIG. 6 illustrates an example of a screen of an electronic device that presents output from the system and receives commands for navigating an imaging device.

The system may be deployed on any suitable electronic device, such as a smartphone or tablet that uses image-usability maps generated by the classifier (such as those shown in FIG. 5) during the image capture process, or on a combination of an image capture device and a back-office or cloud-based system that receives images from the image capture device via a communication network. An example display that outputs a screen 600 for such an app is presented in FIG. 6. The app may simultaneously show a captured image 601, with an indicator of the usability of the captured imagery 602, in real-time. The device may include a user interface 602 by which the operator can make navigational adjustments to the drone and/or the camera to ensure better capture and coverage of the property facet, and the device may transmit this information to the drone or camera.

Figure 7:
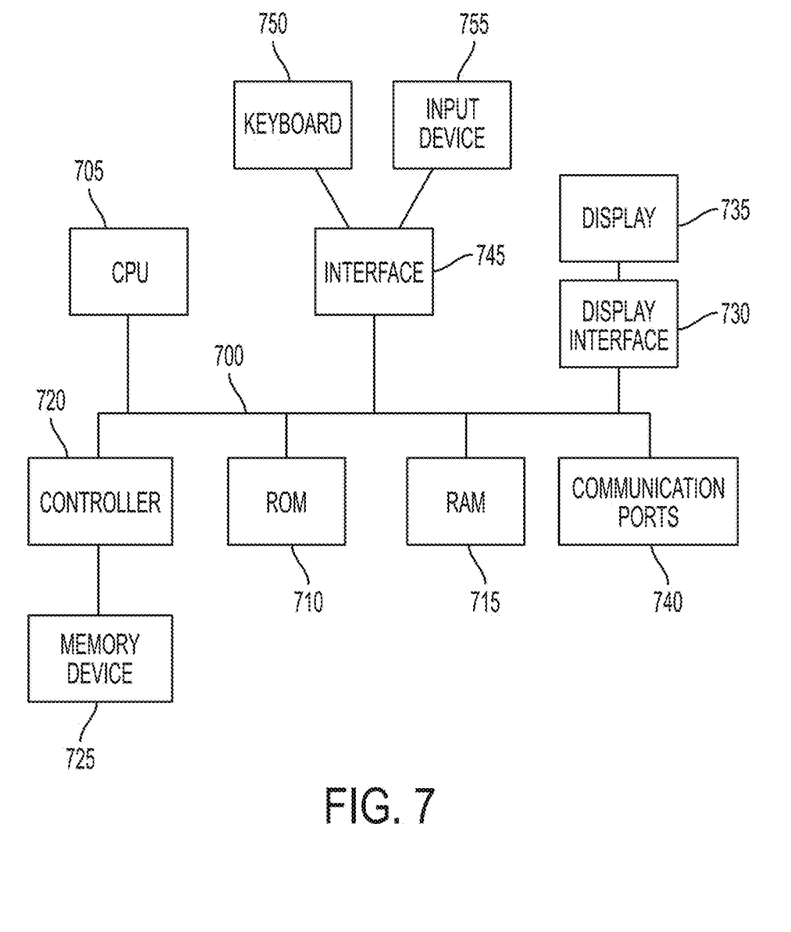
FIG. 7 depicts various embodiments of one or more electronic devices for implementing the various methods and processes described herein.

FIG. 7 depicts an example of internal hardware that may be included in any of the electronic components of the system, the user electronic device or another device in the system. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors. Read only memory (ROM), random access memory (RAM), flash memory, hard drives and other devices capable of storing electronic data constitute examples of memory devices 710. A memory device may include a single device or a collection of devices across which data and/or instructions are stored.

An optional display interface 730 may permit information from the bus 700 to be displayed on a display device 745 in visual, graphic or alphanumeric format. An audio interface and audio output (such as a speaker) also may be provided. Communication with external devices may occur using various communication devices 740 such as a transmitter and/or receiver, antenna, an RFID tag and/or short-range or near-field communication circuitry. A communication device 740 may be attached to a communications network, such as the Internet, a local area network or a cellular telephone data network.

The hardware may also include a user interface sensor 745 that allows for receipt of data from input devices 750 such as a keyboard, a mouse, a joystick, a touchscreen, a remote control, a pointing device, a video input device (camera) and/or an audio input device (microphone). Data also may be received from an imaging capturing device 720 such of a scanner or camera. A GPS or other positional sensor 755 (e.g., gyroscope) and motion sensor 750 (e.g., accelerometer) may be included to detect position and movement of the device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for estimating image quality of a digital image, the system comprising:
   a processing device; and
   a computer-readable medium containing programming instructions that are configured to cause the processing device to:
      access a corpus of digital images of one or more subjects taken by one or more image capturing devices,
      receive, for at least a subset of the corpus of digital images, an indicator that one or more patches of each image in the subset is out of focus,
      train a classifier by obtaining and storing in a data store:
         an n-dimensional feature representation of each pixel in each image; and
         a focus value that represents an extent to which each pixel in the image is in focus or out of focus, and
      use the classifier to analyze pixels of a new digital image and output an assessment of whether each analyzed pixel in the new digital image is in focus or out of focus.

2. The system of claim 1, further comprising additional programming instructions that are configured to cause the processing device to:
   analyze the assessments prepared for each of a plurality of new digital images;
   for each new digital image that has been assessed, determine whether the assessment for the new digital image satisfies a usability criterion; and
   if an assessment for a new digital image satisfies a usability criterion, use that new digital image to determine whether that new digital image depicts damage that corresponds to a particular incident, otherwise not do so.

3. The system of claim 1, wherein the usability criterion comprises:
   a requirement that all pixels of the new digital image have at least a threshold focus value;
   a requirement that an average focus value for all pixels in the new digital image be equal to or above a threshold focus value;

a requirement that no more than a threshold number of pixels in the new digital image have a focus value that is less than a minimum acceptable focus value; or a requirement that no more than a first threshold number of pixels in the new digital image have a focus value that is less than a first minimum acceptable focus value, and that no more than a second threshold number of pixels in the new digital image have a focus value that is less than a second minimum acceptable focus value.

4. The system of claim 1, wherein the instructions to obtain the n-dimensional feature representation of each pixel in each image comprise instructions to use a Convolutional Neural Network to:
 apply n filters to a neighborhood around each pixel;
 determine whether each filtered neighborhood matches a kernel;
 assign a value at or near 1 to the pixels of any filtered neighborhood that matches the kernel;
 assign a value at or near zero to the pixels of any filtered neighborhood that does not match the kernel;
 use the assigned values to determine the focus value.

5. The system of claim 4, wherein the programming instructions that are configured to cause the processing device to use the assigned values to determine the focus value comprise instructions to do so using a two-layer neural network with sigmoid outputs.

6. The system of claim 1, wherein the processing device is part of a mobile electronic device having a display and an imaging device, and the programming instructions are also configured to cause the processing device to:
 cause the display to output a captured image while the imaging device is capturing additional images of one or more subjects; and
 with each captured image, cause the mobile electronic device to output the assessment of whether each analyzed pixel in captured image is in focus or out of focus.

7. The system of claim 1, further comprising:
 an imaging device; and
 additional programming instructions configured to cause the processing device to:
  determine whether the assessment for the new digital image satisfies a usability criterion; and
  if the assessment does not satisfy the usability criterion, automatically cause the imaging device to capture an additional new digital image.

8. The system of claim 1, further comprising:
 an aerial drone that includes an imaging device and a transceiver; and
 additional programming instructions that are configured to cause the processing device to:
  determine whether the assessment for the new digital image satisfies a usability criterion; and
  if the assessment does not satisfy the usability criterion, cause the imaging device of the aerial drone to capture an additional new digital image.

9. The system of claim 1, further comprising additional programming instructions that are configured to cause the processing device to:
 if the assessment does not satisfy the usability criterion, prompt a user of the mobile electronic device to enter a navigational command for the aerial drone; and
 in response to receiving the navigational command, use a transmitter of the mobile electronic device to send the navigational command to the aerial drone.

10. A system for estimating image quality of a digital image, the system comprising:
 a processing device;
 an imaging device; and
 a computer-readable medium containing programming instructions that are configured to cause the processing device to:
  access a corpus of digital images of one or more subjects taken by one or more image capturing devices,
  receive, for at least a subset of the corpus of digital images, an indicator that one or more patches of each image in the subset is out of focus,
  train a classifier by obtaining and storing in a data store:
   an n-dimensional feature representation of each pixel in each image; and
   a focus value that represents an extent to which each pixel in the image is in focus or out of focus, and
  use the classifier to analyze pixels of a new digital image and generate an assessment of whether each analyzed pixel in the new digital image is in focus or out of f determine whether the assessment for the new digital image satisfies a usability criterion; and
  if the assessment satisfies the usability criterion, use the new digital image to determine whether that new digital image depicts damage that corresponds to a particular incident, otherwise automatically cause the imaging device to capture an additional new digital image.

11. The system of claim 10, wherein the usability criterion comprises:
 a requirement that all pixels of the new digital image have at least a threshold focus value;
 a requirement that an average focus value for all pixels in the new digital image be equal to or above a threshold focus value;
 a requirement that no more than a threshold number of pixels in the new digital image have a focus value that is less than a minimum acceptable focus value; or
 a requirement that no more than a first threshold number of pixels in the new digital image have a focus value that is less than a first minimum acceptable focus value, and that no more than a second threshold number of pixels in the new digital image have a focus value that is less than a second minimum acceptable focus value.

12. The system of claim 10, further comprising:
 an aerial drone that includes the imaging device and a transceiver; and
 additional programming instructions that are configured to cause the processing device to:
  if the assessment does not satisfy the usability criterion, prompt a user of the mobile electronic device to enter a navigational command for the aerial drone, and
  in response to receiving the navigational command, use a transmitter of the mobile electronic device to send the navigational command to the aerial drone.

13. A method of estimating image quality of a digital image, the method comprising:
 by a processing device, executing programming instructions that cause the processing device to:
  access a corpus of digital images of one or more subjects taken by one or more image capturing devices,
  receive, for at least a subset of the corpus of digital images, an indicator that one or more patches of each image in the subset is out of focus,
  train a classifier by obtaining and storing in a data store:
   an n-dimensional feature representation of each pixel in each image; and a focus value that represents an extent to which each pixel in the image is in focus or out of focus, and use the classifier to analyze pixels of a new digital image and output an assessment of whether each analyzed pixel in the new digital image is in focus or out of focus.

14. The method of claim 13, further comprising, by the processing device:

analyzing the assessments prepared for each of a plurality of new digital images;

for each new digital image that has been assessed, determining whether the assessment for the new digital image satisfies a usability criterion; and if an assessment for a new digital image satisfies a usability criterion, using that new digital image to determine whether that new digital image depicts damage that corresponds to a particular incident, otherwise not doing so.

15. The method of claim 13, wherein the usability criterion comprises:

a requirement that all pixels of the new digital image have at least a threshold focus value;

a requirement that an average focus value for all pixels in the new digital image be equal to or above a threshold focus value;

a requirement that no more than a threshold number of pixels in the new digital image have a focus value that is less than a minimum acceptable focus value; or a requirement that no more than a first threshold number of pixels in the new digital image have a focus value that is less than a first minimum acceptable focus value, and that no more than a second threshold number of pixels in the new digital image have a focus value that is less than a second minimum acceptable focus value.

16. The method of claim 13, wherein obtaining the n-dimensional feature representation of each pixel in each image comprises using a Convolutional Neural Network to:

apply n filters to a neighborhood around each pixel;

determine whether each filtered neighborhood matches a kernel;

assign a value at or near 1 to the pixels of any filtered neighborhood that matches the kernel;

assign a value at or near zero to the pixels of any filtered neighborhood that does not match the kernel;

use the assigned values to determine the focus value.

17. The method of claim 13, further comprising, by the processing device:

causing a display of a mobile electronic device to output a captured image while the mobile electronic device is capturing additional images of one or more subjects; and with each captured image, causing the mobile electronic device to output the assessment of whether each analyzed pixel in captured image is in focus or out of focus.

18. The method of claim 13, further comprising, by the processing device:

determining whether the assessment for the new digital image satisfies a usability criterion; and if the assessment does not satisfy the usability criterion, automatically causing an imaging device to capture an additional new digital image.

19. The method of claim 13, wherein the imaging device is a component of an aerial done.

20. The method of claim 19, further comprising:

if the assessment does not satisfy the usability criterion, prompting a user of a mobile electronic device to enter a navigational command for the aerial drone; and in response to receiving the navigational command, using a transmitter of the mobile electronic device to send the navigational command to the aerial drone.

* * * * *